United States Patent
Glitho et al.

[19]

[11] Patent Number: 6,134,544
[45] Date of Patent: *Oct. 17, 2000

[54] QUERY SUPPORTING INTERFACE BETWEEN A CUSTOMER ADMINISTRATIVE SYSTEM AND DATABASE NETWORK ELEMENTS IN A TELECOMMUNICATIONS SYSTEM

[75] Inventors: Roch Glitho, Montreal; Francois Leduc, Pincourt, both of Canada; Thomas Crowe, Tipperary, Ireland; Cristina Mazzi, Rome, Italy

[73] Assignee: Telefonaktiebolaget LM Ericsson (publ), Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/975,631

[22] Filed: Nov. 21, 1997

[51] Int. Cl.[7] .................................................. G06F 17/30
[52] U.S. Cl. ........................ 707/3; 707/10; 455/422; 455/436; 379/142; 709/223
[58] Field of Search .................... 707/610, 3, 10; 709/223; 379/142; 455/436, 422

[56] References Cited

U.S. PATENT DOCUMENTS

| | | | |
|---|---|---|---|
| 5,243,645 | 9/1993 | Bissell et al. | 379/211 |
| 5,416,917 | 5/1995 | Adair et al. | 395/500 |
| 5,452,433 | 9/1995 | Nihart et al. | 395/500 |
| 5,515,508 | 5/1996 | Pettus et al. | 395/200.01 |
| 5,584,026 | 12/1996 | Knudsen et al. | 707/1 |
| 5,594,899 | 1/1997 | Knudsen et al. | 707/1 |
| 5,600,833 | 2/1997 | Senn et al. | 707/1 |
| 5,652,876 | 7/1997 | Ashe et al. | 395/500 |
| 5,655,116 | 8/1997 | Kirk et al. | 707/1 |
| 5,664,005 | 9/1997 | Emery et al. | 455/422 |
| 5,682,535 | 10/1997 | Knudsen | 395/701 |
| 5,717,925 | 2/1998 | Harper et al. | 707/102 |
| 5,771,279 | 6/1998 | Cheston et al. | 379/93.17 |
| 5,825,862 | 10/1998 | Voit et al. | 379/142 |
| 5,845,203 | 12/1998 | Ladue | 455/414 |
| 5,845,211 | 12/1998 | Roach, Jr. | 455/436 |
| 5,859,972 | 1/1999 | Subramaniam et al. | 395/200.33 |
| 5,920,618 | 7/1999 | Fleischer, III et al. | 379/207 |
| 5,953,389 | 9/1999 | Pruett et al. | 379/9 |
| 5,999,973 | 12/1999 | Glitho et al. | 709/223 |

FOREIGN PATENT DOCUMENTS

| | | |
|---|---|---|
| 0 584 954 | 3/1994 | European Pat. Off. . |
| 97/15133 | 4/1997 | European Pat. Off. . |
| WO 97/36439 | 10/1997 | WIPO . |
| WO 97/36440 | 10/1997 | WIPO . |

OTHER PUBLICATIONS

PCT International Search Report, Feb. 17, 1999, PCT/SE 98/02108.

*Primary Examiner*—Hosain T. Alam
*Assistant Examiner*—Jean M. Corrielus
*Attorney, Agent, or Firm*—Jenkens & Gilchrist

[57] ABSTRACT

A customer administrative system of a wireless communications system is interfaced with one or more system database network elements to support not only transaction oriented communications, but also query oriented communications. Logic is included in the interface to process and translate search request queries for database network element handling. Results of any searches performed in response to the queries are returned to the interface. The logic then collects the information comprising the results of the searches, and supports file transfer of the collected information to the requesting customer administrative system.

20 Claims, 4 Drawing Sheets

QUERY SUPPORTING INTERFACE BETWEEN A CUSTOMER ADMINISTRATIVE SYSTEM AND DATABASE NETWORK ELEMENTS IN A TELECOMMUNICATIONS SYSTEM

BACKGROUND OF THE INVENTION

1. Technical Field of the Invention

The present invention relates to telecommunications systems and, in particular, to an enhancement of the interface between a customer administrative system and database network elements of a telecommunications system to support query oriented processing in addition to transaction oriented processing.

2. Description of Related Art

Reference is now made to FIG. 1 wherein there is shown a block diagram of a portion of a telecommunications network 10 implementing a prior art transaction-based interface (IF) 12 between a customer administrative system (CAS) 14 and a plurality of database network elements (NE) 16. The telecommunications network 10 comprises a wireless (for example, cellular) communications system, and each database network element 16 comprises a home location register (HLR) database storing permanent and temporary wireless subscriber data. The permanent data stored in the database network element 16 comprises fixed information concerning the communications service subscripted to by each subscriber. The temporary data stored in the database network element 16 comprises variable information concerning the current location of each subscriber.

The customer administrative system 14 is utilized to engage in transactions relating to the administration of the permanent data stored in each database network element 16. These administration activities, in general, relate to transactions performed for the purposes of customer (i.e., subscriber) creation or definition, service activation, and the like, relating to a given customer. More particularly, the transactions relate to subscriber data administration tasks such as:

subscription initiation/removal/status, subscriber activation/cancellation, service provision/withdrawal/activation/passivation, C-number (transfer) definition, pass code changes, and serial number changes.

The transactions may further relate to authentication administration tasks such as authentication activation/change/deactivation/status. Additionally, the transactions relate to numbering plan configuration including number range assignment, numbering plan deletion and numbering plan viewing.

By "transaction-based" it is meant that the interface 12 receives orders originated at the customer administrative system 14 and directed (i.e., addressed) to a particular one of the database network elements 16, converts those commands to a proper format for communication to and/understanding by the addressed database network element, and routes to the addressed database network element. Similarly, the interface 12 receives any response to the order from the addressed database network element 16, converts the response to a proper format for communication to and/understanding by the customer administrative system 14 that originated the order, and routes to the originating customer administrative system. Thus, one order generated by the customer administrative system 14 which is sent through the interface 12 to an addressed database network element 16 produces one corresponding response. Queries comprising interrogations of one or more of the database network elements 16, however, cannot be generated by the customer administrative system 14 and pass through the transaction-based interface 12.

There is a need for an improved interface between a customer administrative system and one or more database network elements that will support not only database querying, but also the communication of files containing the results of the querying operation.

SUMMARY OF THE INVENTION

An interface between a customer administrative system and one or more database network elements of a wireless communications system includes logic for supporting database querying and the communication of query results by file transfer. The logic within the interface functions responsive to a query originated by a customer administrative system to process the query and identify which one or ones of the database network elements must be addressed in order to respond to the query. The logic then generates individual query requests in proper format for each individual database network element. The formatted query requests are then routed to the proper database network elements for processing. The logic then receives results of the query processing from each of the addressed database network elements, and collects the information for file transfer back to the requesting customer administrative system.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 2:
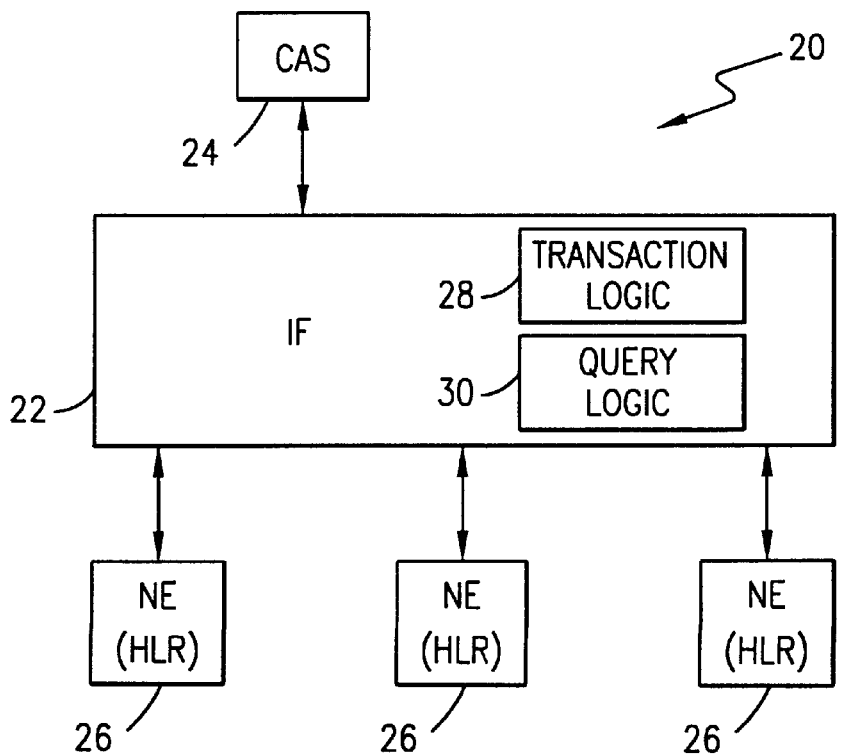
FIG. 2 is a block diagram of a portion of a telecommunications network implementing a present invention query-based interface between a customer administrative system and a plurality of database network elements.

Reference is now made to FIG. 2 wherein there is shown a block diagram of a portion of a telecommunications network 20 implementing a present invention query-based interface (IF) 22 between a customer administrative system (CAS) 24 and a plurality of database network elements (NE) 26. Again, the telecommunications network 20 comprises a wireless (for example, cellular) communications system, and each database network element 26 comprises a home location register (HLR) database storing permanent and temporary wireless subscriber data as previously described. Thus, the database network elements 26 store permanent data comprising subscriber communications service information, and temporary data comprising the current location of each subscriber.

Figure 1:
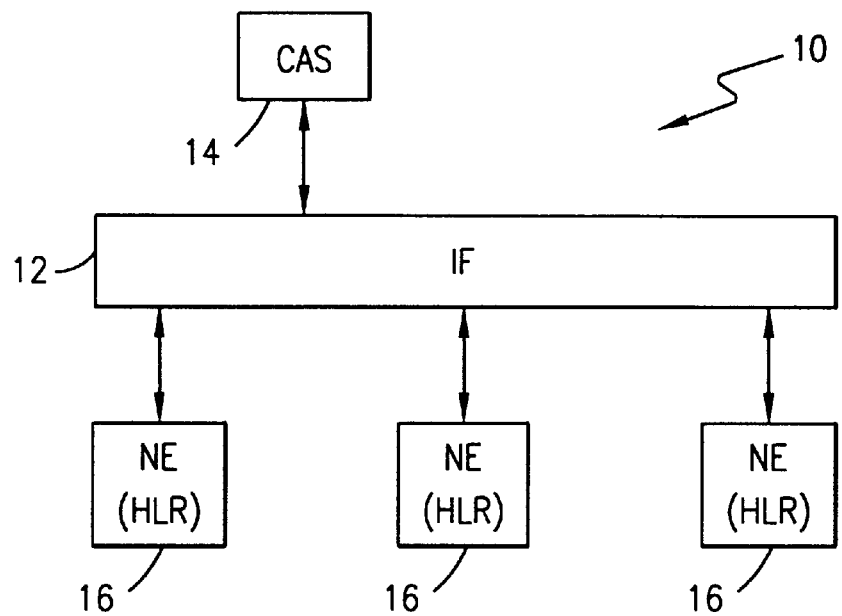
FIG. 1, previously described, is a block diagram of a portion of a telecommunications network implementing a prior art transaction-based interface (IF) between a customer administrative system (CAS) and a plurality of database network elements (NE)

The query-based interface 22 supports the same transaction-based processing as the prior art interface 12 illustrated in FIG. 1 and previously described. These transactions involve customer administrative system 24 operation in administrating the permanent data stored in each database network element 22. For example, customer administration system 24 operation in administrating subscriber data (relating to subscriptions, services and the like), authentication data and numbering plan data are supported by the transaction oriented logic 28 of the interface 22. This transaction oriented logic 28 receives orders originated at the customer administrative system 24, converts those orders into commands having a proper format for communication to and/understanding by an addressed database network element 26, and routes properly formatted commands to the addressed database network element. The transaction oriented logic 28 further receives any response to the commands from the addressed database network element 26, converts the response (if necessary) to a proper format for communication to and/understanding by the customer administrative system 24 that originated the order, and routes the properly formatted response to the originating customer administrative system.

The interface 22 further supports customer administrative system 24 querying of the plurality of database network elements 26 regarding the stored permanent information. These queries involve customer administrative system 24 operation in searching the permanent data stored in each database network element 26. Customer administrative system 24 operation in searching the subscriber data stored in the plurality of database network elements 26 is supported by a query oriented logic 30 of the interface 22. This query oriented logic 30 receives search requests originated at the customer administrative system 24, determines which one or ones of the plurality of database network elements 26 need to be queried to complete the search request, converts those requests into queries having a proper format for communication to and/understanding by each individual one of the necessary database network elements, and routes properly formatted queries to the necessary database network element for handling. Following database network element 26 handling of the query, search results are returned back to the interface 22. The query oriented logic 30 then collects the data of the returned search results in a file, signals the customer administrative system 24 which originated the search request, and engages in a file transfer of the data (properly formatted) with that originating customer administrative system.

Figure 3A:
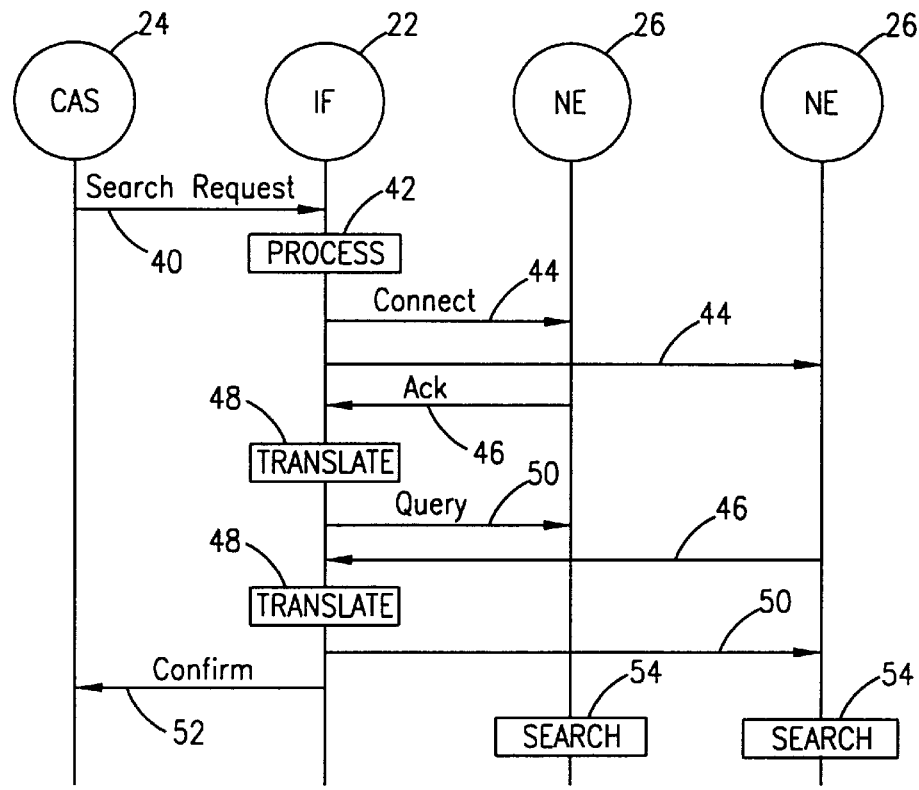
FIGS. 3A–3B are nodal operation and signal flow diagrams illustrating query-based interface operation for handling customer administrative system queries of database network elements.
Figure 3B:
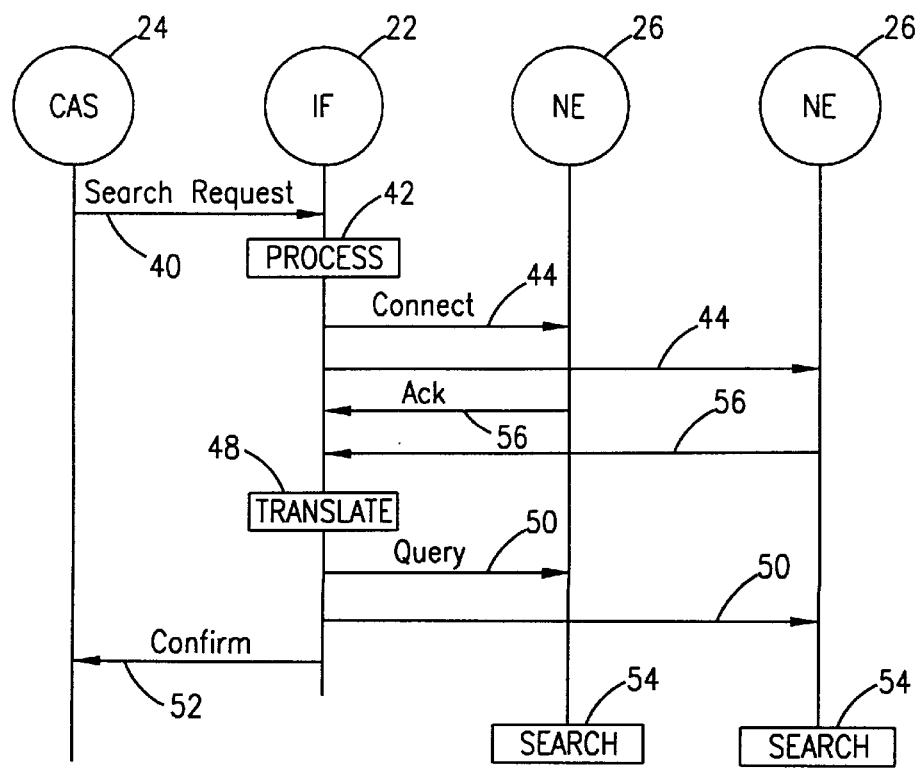

Reference is now made to FIGS. 3A–3B wherein there are shown nodal operation and signal flow diagrams illustrating query-based interface 22 operation for handling customer administrative system 24 queries of database network elements 26. FIGS. 3A and 3B illustrate two search procedures implemented by the interface 22. In the first procedure, database network element 26 processing of the search request is performed pursuant to a "best effort protocol" wherein the query oriented logic 30 (FIG. 2) tries to perform as complete a search (i.e., in as many relevant database network elements) as possible. In the second procedure, database network element 26 processing of the search request is performed pursuant to an "atomic protocol" wherein the query oriented logic 30 only performs the search if a complete search (i.e., in all relevant database network elements) is possible.

Turning first to FIG. 3A, the customer administrative system 24 sends a machine independent search request 40 to the interface 22. The query oriented logic 30 (FIG. 2) processes the received search request in action 42 to determine which one or ones of the plurality of database network elements 26 need to be queried to complete the search request. With identification of these database network elements 26, the interface 22 attempts to make a communications connection 44 to each of the identified network elements. A connection to each identified database network element is not a requirement to continued processing and handling of a search request query. Responsive to each connection acknowledgment 46 received from an identified database network element 26, the query oriented logic 30 then translates the received search request in action 48 into a machine dependent database query 50 specifically formatted for transmission to that acknowledging database network element. Confirmation 52 of the ordering of the search to that acknowledging database network element is then sent back to the customer administrative system 24. Meanwhile, each database network element 26 that received the specially formatted database query 50 performs the requested search (action 54).

Reference is now made to FIG. 3B. The customer administrative system 24 sends a machine independent search request 40 to the interface 22. The query oriented logic 30 (FIG. 2) processes the received search request in action 42 to determine which one or ones of the plurality of database network elements 26 need to be queried to complete the search request. With identification of these database network elements 26, the interface 22 attempts to make a communications connection 44 to each of the identified network elements. Responsive only to a connection acknowledgment 56 received from all of the identified database network elements 26, the query oriented logic 30 then translates the received search request in action 48 into a machine dependent database query 50 specifically formatted for transmission to each database network element. Confirmation 52 of the ordering of the search to all identified database network elements is then sent back to the customer administrative system 24. Meanwhile, all of the identified database network elements 26 that received the specially formatted database query 50 perform the requested search (action 54). If not all of the database network elements 26 acknowledge 56, the confirmation 52 includes an indication that the search has been aborted.

The translation of action 48 performed by the query oriented logic 30 may comprise a conversion of the search request message 40 from a given format and protocol (such as a generic, abstract or machine independent language) associated with the customer administrative system 24 to a certain format and protocol associated with each individual one of the identified database network elements 26 (such as a machine dependent language). For example, the search request message 40 format and protocol may be translated to man-machine-language (MML) commands compatible with each of the database network elements 26. Alternatively, a translation of the search request message 40 may be made via a machine-machine-interface (MMI) (such as standard query language—SQL) which is unique to one or more of the identified database network elements 26. Other translations and conversions may be implemented in accordance with these teachings by persons of ordinary skill in the art.

Reference is now made to FIGS. 4A–4D wherein there are shown nodal operation and signal flow diagrams illustrating query-based interface 22 operation for handling file transfer of query search results. Four alternatives for file transfer are available for use and selection by the query-based interface 22 following database network element 26 delivery 60 of the search results.

Figure 4A:
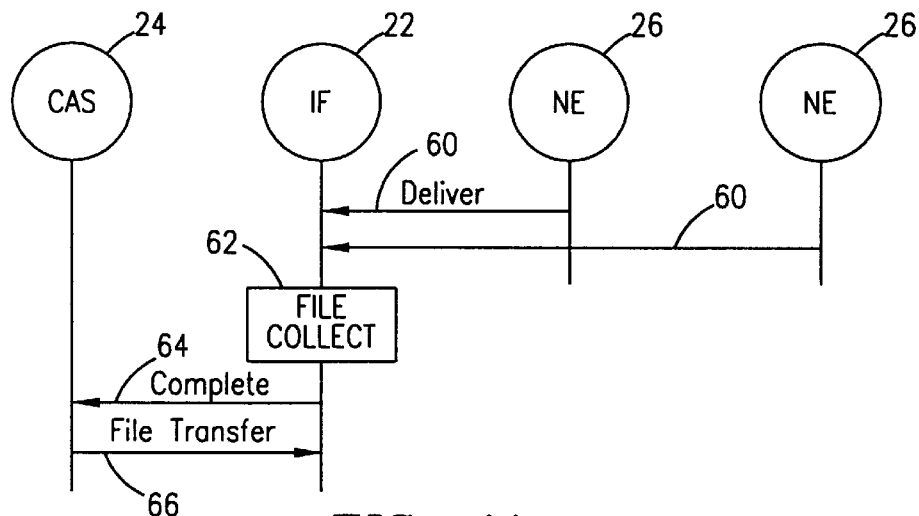
FIGS. 4A–4D are nodal operation and signal flow diagrams illustrating query-based interface operation for handling file transfer of query search results.

In FIG. 4A, it is assumed that the customer administrative system 24 is connected to the interface 22 by means of a "telnet" service implementing a fairly general, bi-directional, eight-bit byte oriented communications facility supporting a standard method for interfacing between terminal devices and/or terminal-oriented processes. This telnet session may comprise the same session as that which was, or may have been, used to support the search request 40 and confirmation 52 transaction of FIGS. 3A–3B. The database network element 26 delivered 60 search results are collected by the query oriented logic 30 (FIG. 2) in a file (action 62). When all the search results have been delivered and the search result file is complete, the query oriented logic 30 sends a search complete notification 64 to the originally requesting customer administrative system 24. The customer administrative system 24 then initiates a file transfer protocol (FTP) link 66, possibly using the existing telnet service, to retrieve the query oriented logic 30 collected search results. In the event the previously existing telnet session from the transaction of FIGS. 3A or 3B times out prior to the notification 64, a new telnet session (not shown, see FIGS. 4C and 4D) may be initiated to support the link 66.

Figure 4B:
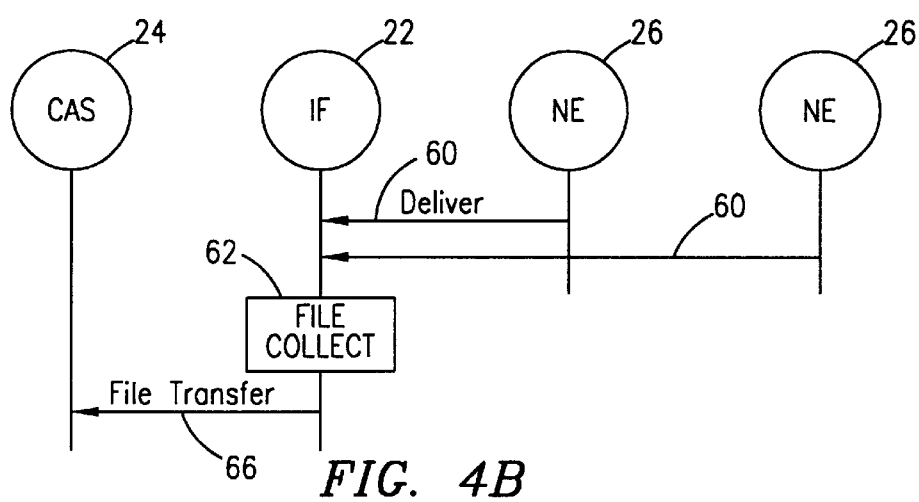

Reference is now made to FIG. 4B. Here, it is again assumed that the customer administrative system 24 is connected to the interface 22 by means of a "telnet" service. The database network element 26 delivered 60 search results are collected by the query oriented logic 30 (FIG. 2) in a file (action 62). When all the search results have been delivered and the search result file is complete, the query oriented logic 30 of the interface 22 initiates a file transfer protocol (FTP) link 66, possibly using the existing telnet service, to deliver the collected search results to the originally requesting customer administrative system 24. No independent notification of search completion is provided by the interface 22 to the customer administrative system 24. In the event the previously existing telnet session from the transaction of FIGS. 3A or 3B times out prior to the file transfer 66, a new telnet session (not shown, see FIGS. 4C and 4D) may be initiated to support the link 66.

Figure 4C:
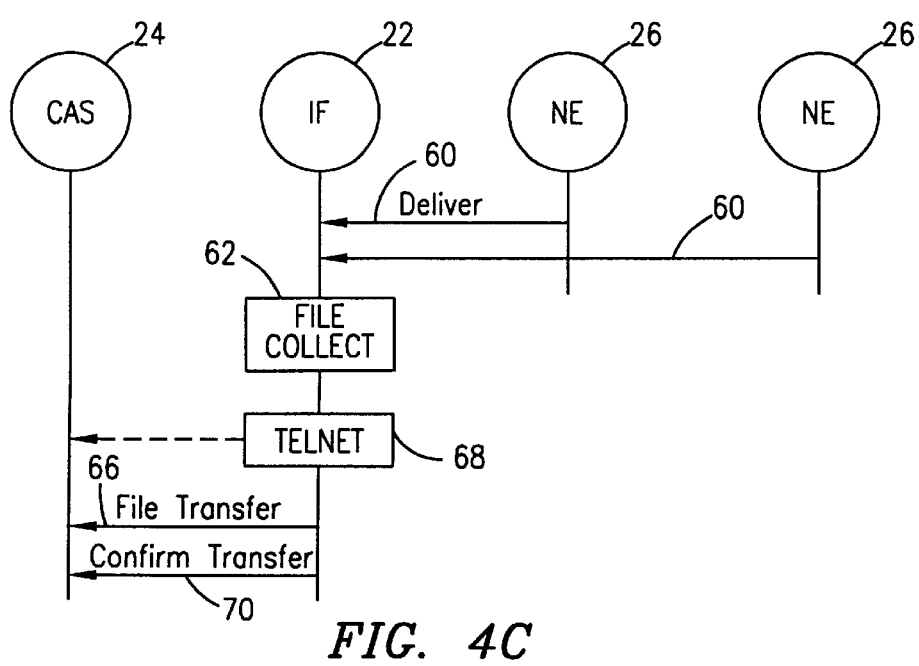

Turning next to FIG. 4C, the database network element 26 delivered 60 search results are collected by the query oriented logic 30 (FIG. 2) in a file (action 62). When all the search results have been delivered and the search result file is complete, the query oriented logic 30 of the interface 22 initiates (action 68) a new telnet service session connection with the originally requesting customer administrative system 24. A file transfer protocol (FTP) link 66 is then initiated, possibly using the new telnet session, to deliver the collected search results to the originally requesting customer administrative system 24. In order to initiate 68 the new session, the query oriented logic 30 must know the address of the requesting customer administrative system 24. This addressing information may be provided by the requesting customer administrative system 24 in the search request message 40 (see, FIGS. 3A and 3B). Independent notification 70 of search completion is thereafter provided by the interface 22 to the customer administrative system 24.

Figure 4D:
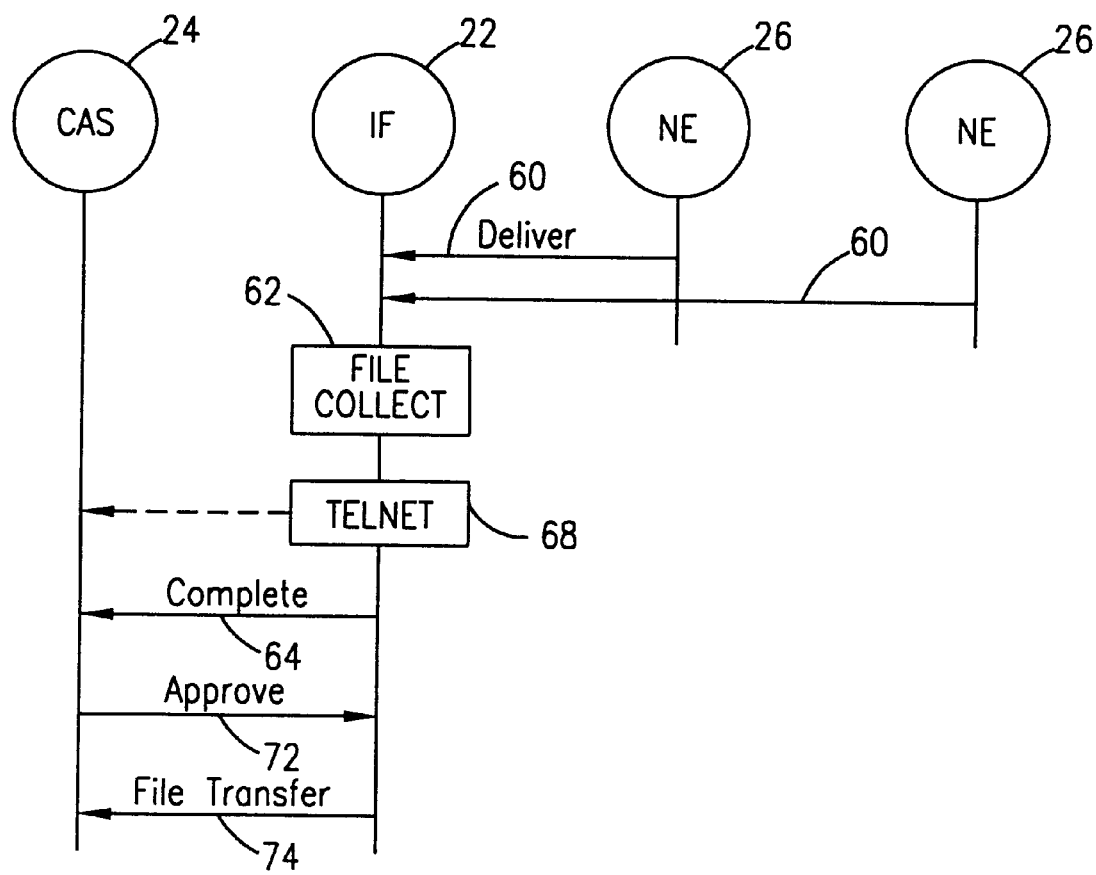

Referring now to FIG. 4D, the database network element 26 delivered 60 search results are collected by the query oriented logic 30 (FIG. 2) in a file (action 62). When all the search results have been delivered and the search result file is complete, the query oriented logic 30 of the interface 22 initiates (action 68) a new telnet service session connection with the originally requesting customer administrative system 24. Using this new telnet service session, the query oriented logic 30 sends a search complete notification 64 to the originally requesting customer administrative system 24. As in FIG. 4C, the addressing information provided in the search request message 40 (see, FIGS. 3A and 3B) is used to initiate the link. The notification 64 includes an indication of the size of the search result file. If the customer administrative system 24 desires the file, it then sends a file transfer approved message 72 back to the interface 22. Responsive thereto, the interface 22 delivers 74 the collected search results to the originally requesting customer administrative system 24 possibly using the new telnet session.

The use of a telnet session to support the file transfers 66 and 74 of FIGS. 4A–4D is not necessarily required. The FTP protocol utilized for the file transfers 66 and 74 may be initiated between the interface 22 and customer administrative system 24 without use of an active telnet session.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An interface between a customer administrative system and a plurality of database network elements of a wireless communications system, the database network elements storing both permanent data and temporary data, comprising:

first logic for supporting transaction oriented communications addressed by the customer administrative system to a selected one of the plurality of database network elements in order to administer the stored permanent data; and second logic for supporting query oriented communications sent by the customer administrative system to the interface, the second logic operating to determine for an individual query oriented communication sent to the interface which plural database network elements should be contacted in connection with handling the individual query oriented communication to administer the stored permanent data, and then send the individual query oriented communication on to those plural identified database network elements, wherein the second logic further functions to:

receive a search request sent from the customer administrative system to the interface;

identify based on the search request which plural ones of the plurality of database network elements must be queried in order to respond to the search request;

translate the search request into corresponding plural database queries each specifically tailored for an identified one of the database network elements; and apply the database queries to the identified plural database network elements for processing.

2. The interface as in claim 1 wherein the second logic function to apply further functions to check before applying the database queries that each identified database network element is available to process the database queries.

3. The interface as in claim 1 wherein the second logic functions to:

receive results from plural database network element processing of the database queries;

collect the plural results in a single file; and support transfer of the file to the customer administration system.

4. The interface as in claim 3 wherein the second logic function to support further functions to:
  notify the customer administration system concerning the completion of the processing of the database queries by each database network element; and
  support customer administration system retrieval of the file containing the results of database network element processing of the database queries.

5. The interface as in claim 3 wherein the second logic function to support further functions to deliver the file containing the results of database network element processing of the database queries to the customer administration system.

6. The interface as in claim 5 wherein the second logic function to deliver further functions to notify the customer administration system of the delivery of the file containing the results of database network element processing of the database queries.

7. The interface as in claim 3 wherein the second logic function to support further functions to:
  notify the customer administration system of a size of the file containing the results of database network element processing of the database queries; and
  responsive to a delivery approval notification from the customer administration system, deliver the file containing the results of database network element processing of the database queries to the customer administration system.

8. The interface as in claim 1 wherein the second logic function to translate further functions to convert the search request from a machine independent language into the one or more database queries each having a machine dependent language for the identified database network elements.

9. The interface as in claim 1 wherein the customer administrative system supports data definition within a telecommunications network.

10. The interface as in claim 9 wherein the database network elements comprise home location registers of the telecommunications network.

11. A method for interfacing a customer administrative system and a plurality of database network elements of a wireless communications system to support query oriented communications, the database network elements storing permanent data and temporary data, comprising the steps of:
  receiving a search request sent by the customer administrative system to the interface concerning the administration of the permanently stored data;
  identifying based on the search request which plural ones of the database network elements must be queried in order to respond to the search request;
  translating the search request into corresponding plural database queries each specifically tailored for one of the identified plural database network elements; and
  applying the plural database queries to the identified plural database network elements for processing to administer the permanently stored data.

12. The method as in claim 11 wherein the step of applying further comprises the step of checking before applying the database queries that each identified database network element is available to process the database queries.

13. The method as in claim 11 further including the steps of:
  receiving results from plural database network element processing of the database queries;
  collecting the plural results in a single file; and
  supporting transfer of the file to the customer administration system.

14. The method as in claim 12 wherein the step of supporting further comprises the steps of:
  notifying the customer administration system concerning the completion of the processing of the database queries by each database network element; and
  supporting customer administration system retrieval of the file containing the results of database network element processing of the database queries.

15. The method as in claim 13 wherein the step of supporting further comprises the step of delivering the file containing the results of database network element processing of the database queries to the customer administration system.

16. The method as in claim 15 wherein the step of delivering further comprises the step of notifying the customer administration system of the delivery of the file containing the results of database network element processing of the database queries.

17. The method as in claim 13 wherein the step of supporting further comprises the steps of:
  notifying the customer administration system of a size of the file containing the results of database network element processing of the database queries; and
  responsive to a delivery approval notification from the customer administration system, delivering the file containing the results of database network element processing of the database queries to the customer administration system.

18. The method as in claim 11 wherein the step of translating comprises the step of converting the search request from a machine independent language into the one or more database queries each having a machine dependent language for the identified database network elements.

19. The method as in claim 11 wherein the customer administrative system supports data definition within a telecommunications network.

20. The method as in claim 19 wherein the database network elements comprise home location registers of the telecommunications network.

* * * * *